United States Patent [19]

Teramoto et al.

[11] Patent Number: 5,172,150
[45] Date of Patent: Dec. 15, 1992

[54] APPARATUS FOR CORRECTING IMAGE BLUR CAUSED BY CAMERA SHAKE

[75] Inventors: Tougo Teramoto, Wakayama; Yukihiro Ueyama, Osaka, both of Japan

[73] Assignee: Minolta Camera Kabushiki Kaisha, Osaka, Japan

[21] Appl. No.: 592,241

[22] Filed: Oct. 3, 1990

[30] Foreign Application Priority Data

Oct. 4, 1989 [JP] Japan ............................ 1-261052
Mar. 23, 1990 [JP] Japan ............................ 2-75194

[51] Int. Cl.⁵ .......................... G03B 5/00; G02B 27/64
[52] U.S. Cl. ................................... 354/202; 358/222; 359/554
[58] Field of Search ............... 354/430, 70, 152, 202; 358/222; 350/500; 359/554-557

[56] References Cited

U.S. PATENT DOCUMENTS 4,965,619 10/1990 Shikaumi et al. ............ 354/430 X
4,970,540 11/1990 Vasey et al. .................... 354/202

Primary Examiner—W. B. Perkey
Attorney, Agent, or Firm—Burns, Doane, Swecker & Mathis

[57] ABSTRACT

An apparatus for correcting image blur caused by a camera shake includes a sensor for detecting blur of an object image focused by a photographing optical system, and a correcting lens for correcting the image blur. The correcting lens is driven from the ON time of a release switch by a stepping motor. Since the stepping motor is driven before the start of exposure, image blur of higher speed can be corrected immediately after the opening of the shutter.

16 Claims, 12 Drawing Sheets

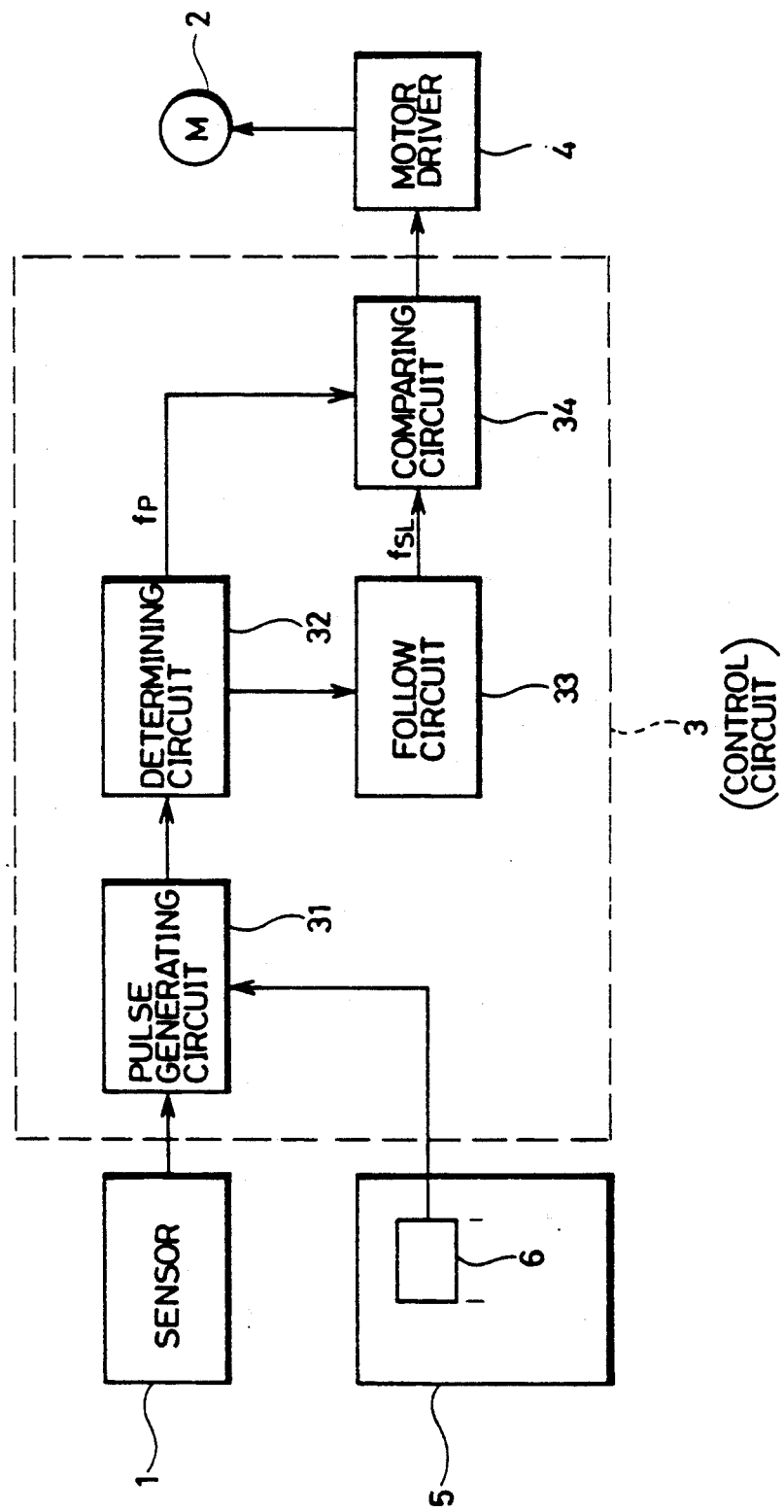

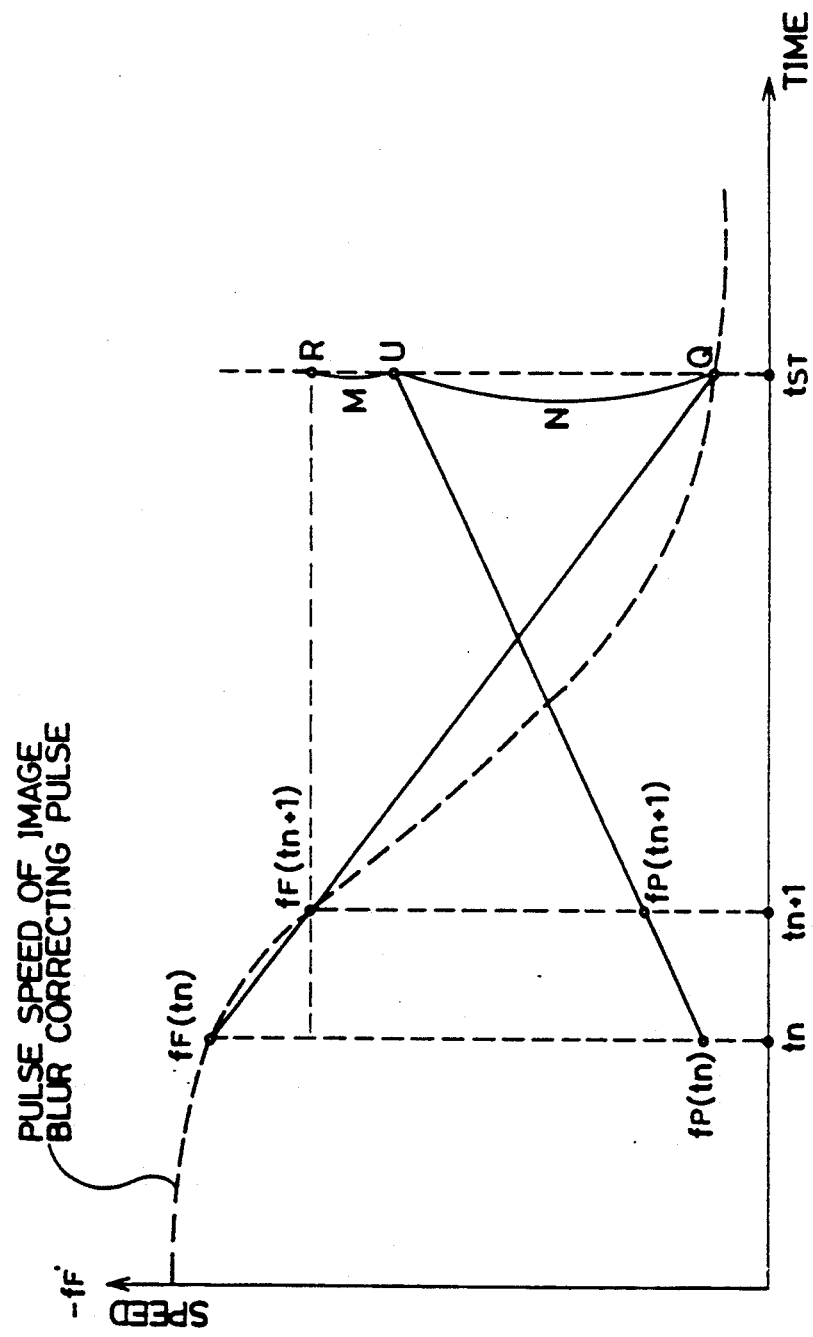

APPARATUS FOR CORRECTING IMAGE BLUR CAUSED BY CAMERA SHAKE

BACKGROUND OF THE INVENTION

1. Field of the Invention

The present invention relates to an apparatus for correcting image blur caused by a camera shake and, more specifically, to an apparatus for correcting image blur in which image blur caused by camera shake can be corrected immediately after the opening of a shutter.

2. Description of the Related Art

It has been proposed to incorporate an angular velocity sensor in a video camera so as to detect atitude of the camera (Japanese Patent Laying-Open No. 61-289769). An angular velocity sensor such as an autogiro using a high-speed rotating body, or one utilizing Coriolis force generated from a vibrating tuning fork has been used. Now, image blur caused by a camera shake can be corrected if such an angular velocity sensor is incorporated in a camera and a portion of a taking lens of the camera is driven based on the output from the angular velocity sensor so as to offset the image blur. Precision in correcting image blur may be increased if a stepping motor is used for driving the portion of the taking lens.

Correction of image blur using the stepping motor will be described in the following.

FIG. 1 shows an image blur (displacement) caused by a camera shake. The displacement $f_F$(mm) is shown as a track of image point existing at the center of the frame at the time $t_4$. The periods A and B are exposure periods when photographing is done with shutter speed of 1/10 sec, with different timings of shutter opening. Time change of the image blur speed $f_F'$ (mm/s), corresponding to the time change of the displacement $f_F$ shown as an example in FIG. 1, is shown in FIG. 2. As is apparent from the figure, in the exposure period A, the speed $f_F'$ of image blur gradually decreases immediately after the opening of the shutter, while in the exposure period B, the speed $f_F'$ of image blur gradually increases immediately after the opening of the shutter. In such a case, the stepping motor can follow the image blur in the exposure period B, however, the stepping motor can not always follow the image blur in the period A. The reason for this will be described in the following.

The speed-torque characteristic of the stepping motor is shown in FIG. 3. The speed of the stepping motor is represented as pulse speed (pulse number [PPS] inputted to the stepping motor per 1 second). In an self-starting region, start, stop and reverse rotation of the stepping motor can be done at a moment regardless of the combination of the pulse speed and a torque. However, in a through region, the stepping motor can not be started at once, so that slow up control becomes necessary, in which the motor is started in the self-starting region, the pulse speed is increased gradually, and then it is driven in the through region.

FIGS. 4 and 5 show examples of image blur correction in the exposure period A, showing relations between displacement, speed and time. In the hatched potion of FIG. 5, the stepping motor is not started, and it follows the input pulse from the time $t_S$. The reason for this is that the pulse speed $f_P$ of the image blur correcting pulses applied at the start is high and is in the through region of the stepping motor. When the pulse speed $f_P$ of the image blur correcting pulses gradually decreases as time passes and enters the self-starting region, the motor starts at the time $t_S$. Referring to the image displacement of FIG. 4 corresponding to the above operation, the actual correction amount $f_M$ to the time $t_s$ is 0, while the aimed amount of correction is $(-f_F)$, namely, correction shown by the hatched potion $S_X$ is not carried out. After the time $t_S$, the actual amount of correction $f_M$ does not coincide with the aimed amount $(-f_F)$ of correction. However, the distance $\Delta l$ between these amounts in the direction of displacement becomes constant, realizing the correcting realizing the correcting operation. Meanwhile, in the exposure period B, the pulse speed inputted to the stepping motor in the initial stage is in the self-starting region and the stepping motor is immediately started following the input pulse, so that correcting operation can be carried out throughout the exposure position B, as shown in the example of FIG. 6.

Therefore, in the exposure period A, correcting operation immediately after the opening of the shutter can not be done, while in the exposure period B, correcting operation can be carried out immediately after the opening of the shutter.

As described above, the stepping motor has two operation regions, that is, the self-starting region and the through region. When the stepping motor is started immediately after the opening of the shutter, control under the through region can not be realized, so that the possible speed of image blur correction is slower than the specific limit of the stepping motor.

SUMMARY OF THE INVENTION

Therefore, an object of the present invention is to enable correction of image blur caused by a camera shake of higher speed immediately after opening of the shutter, in an image blur correcting apparatus of a camera driving an image blur correcting lens by means of a stepping motor.

Another object of the present invention is to surely correct image blur in an image blur correcting apparatus of a camera driving an image blur correcting lens by means of a stepping motor.

A further object of the present invention is to prevent malfunction of a correcting stepping motor in correcting image blur, in an image blur correcting apparatus of a camera driving an image blur correcting lens is driven by using the stepping motor.

The above described objects of the present invention can be attained by an apparatus for correcting image blur caused by a camera shake wherein an image blur correcting lens is driven by using a stepping motor, comprising: a photographing optical system; a sensor for detecting the camera shake; a correcting lens provided in the photographing optical system for correcting the image blur; a stepping motor for driving the correcting lens; and controlling means generating pulses for correcting the blur of the object image based on outputs from the sensor, and for driving the stepping motor based on the pulses.

The stepping motor driving the image blur correcting lens is driven a prescribed time before the start of exposure. Therefore, image blur of higher speed can be corrected immediately after the opening of the shutter.

Preferably, in the apparatus for correcting image blur caused by the camera shake, the prescribed time before the start of exposure means on time of a release switch. The stepping motor for correcting the image blur is driven from the on time of the release switch. Since a prescribed time is required from the turning on of the release switch to the start of exposure, following operation is enabled in this period. Therefore, image blur can be surely corrected in the image blur correcting apparatus of a camera driving the image blur correcting lens by using a stepping motor.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 7 is a block diagram showing main potions of an apparatus for correcting image blur in accordance with the present invention;

FIG. 13 shows a principle idea of a second embodiment of the present invention;

DESCRIPTION OF THE PREFERRED EMBODIMENTS

(1) First Embodiment

Figure 1:
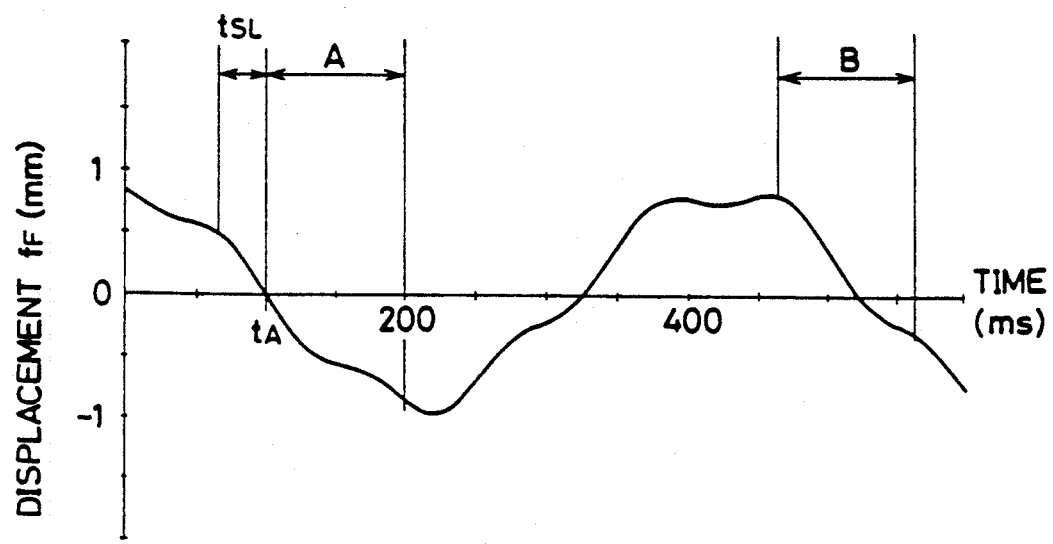
FIG. 1 shows time change of an image displacement caused by a camera shake.
Figure 2:
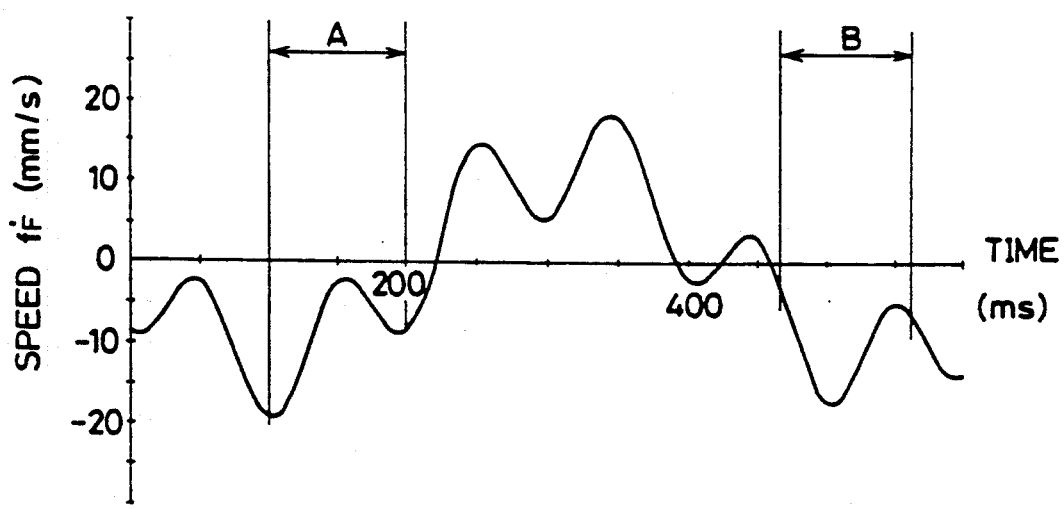
FIG. 2 shows time change of an image blur speed of FIG. 1.
Figure 3:
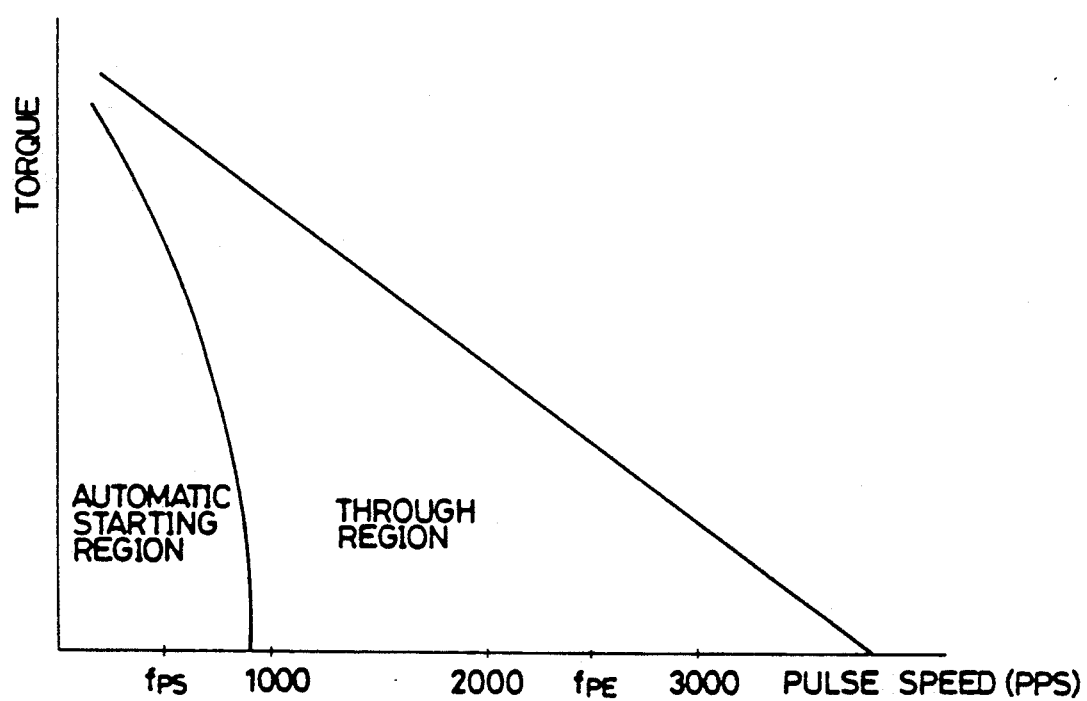
FIG. 3 shows speed-torque characteristic of a stepping motor.
Figure 4:
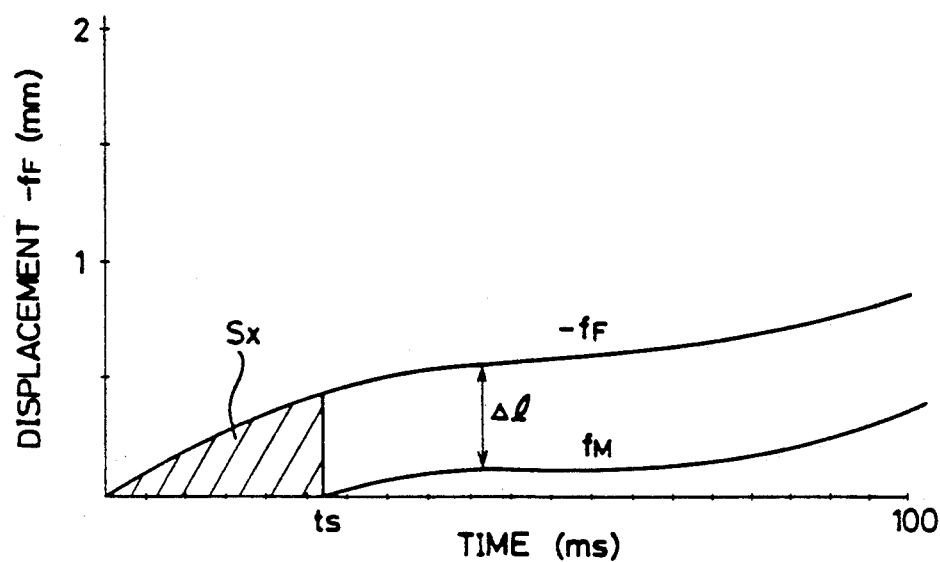
FIGS. 4 to 6 show operations when following control is not carried out.
Figure 5:
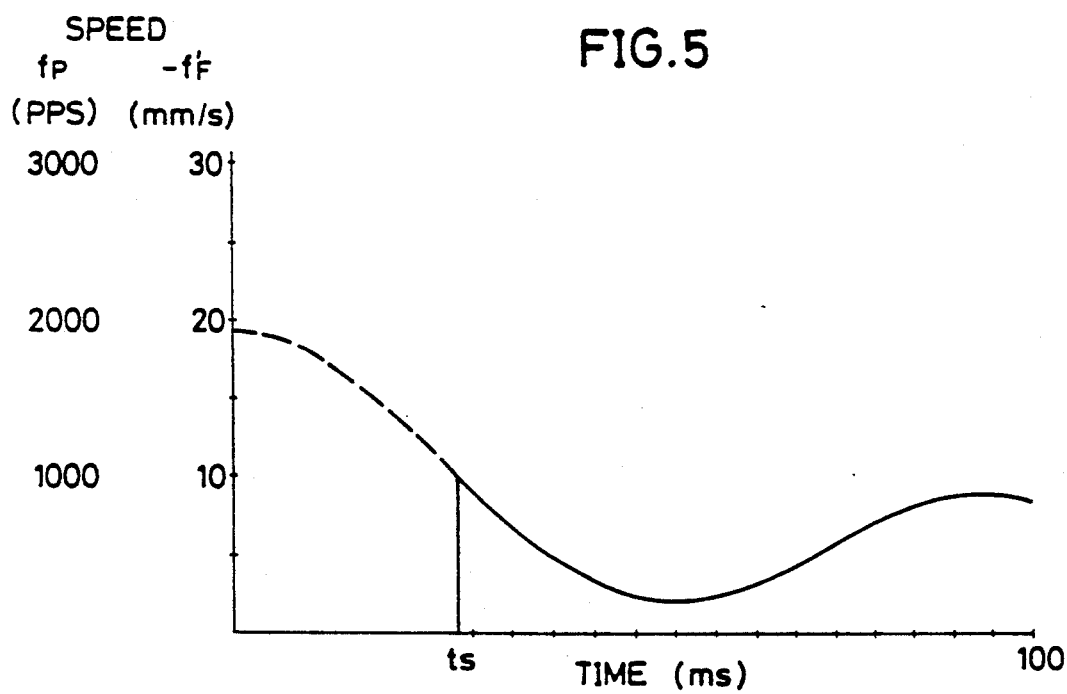
Figure 6:
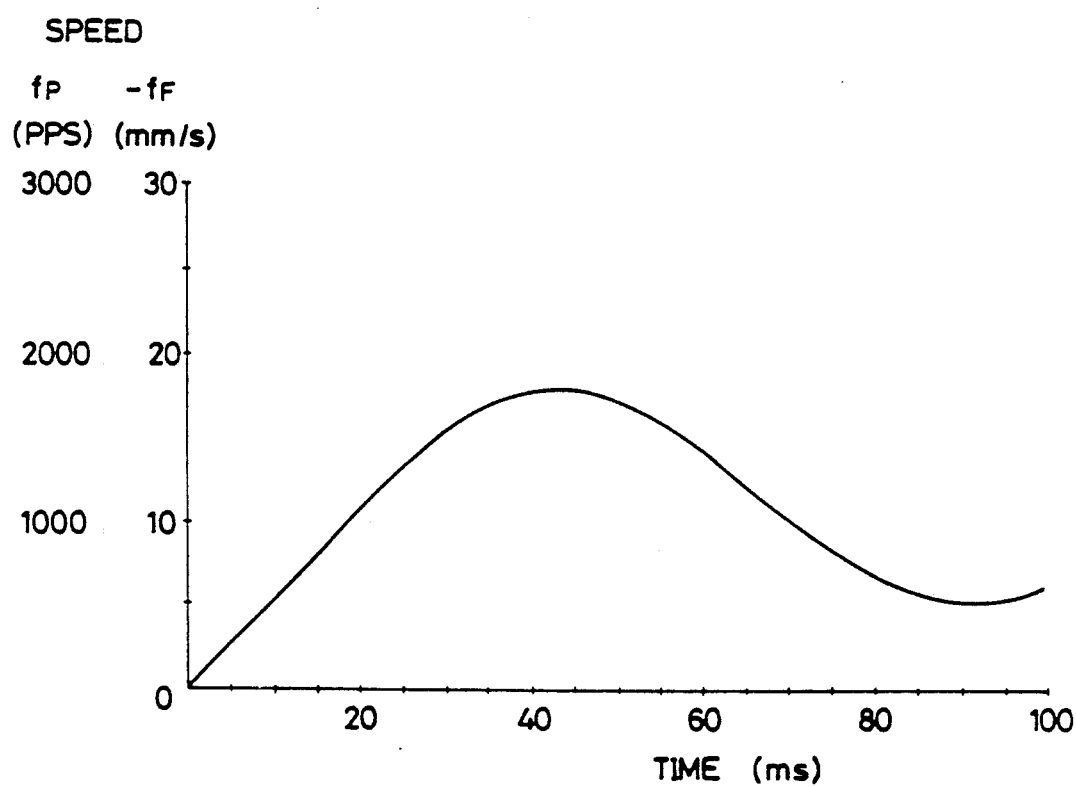

FIG. 7 is a block diagram showing main potions of an image blur correcting apparatus in accordance with the present invention.

Referring to FIG. 7, the image blur correcting apparatus comprises a sensor 1 for detecting camera shake formed of an angular velocity sensor, a stepping motor 2 for driving an image blur correcting lens included in a photographing optical system of the camera, a control circuit 3 for controlling the stepping motor 2 based on the output from the sensor 1, a motor driver 4 for driving the stepping motor 2 based on control pulses outputted from the control circuit 3, an exchange lens 5, and a ROM 6 contained therein.

The structure of the control circuit 3 will be described. The pulse generating circuit 31 generates image blur correcting pulses based on an angular velocity information $f_F'(t)$ provided from the sensor 1 and on an image conversion coefficient $K_B$ of the exchange lens 5 read from the ROM 6 contained in the exchange lens 5. The pulse generating circuit 31 is connected to a determination circuit 32 determining whether the pulse speed $f_P$ of the image blur correcting pulse is in the self-starting region or in the through region. If it is determined by the determination circuit 32 that the pulse speed of the image blur correcting pulse is in the through region, a follower circuit 32 starts operation and outputs following pulses. In the above described exposure period A, the slow up circuit 33 operates, while in the exposure period B, it does not operate. The slow up circuit 33 is connected to a comparing circuit 34 comparing the pulse speed $f_B$ of the image blur correcting pulse and the pulse speed $f_{SL}$ of the following pulse. If $f_P > f_{SL}$ when the slow up circuit 33 is in operation, it outputs following pulses, and if $f_P \leq f_{SL}$, it outputs image blur correcting pulses. However, if the slow up circuit 33 is not in operation, the image blur correcting pulses are outputted as they are.

Figure 8A:
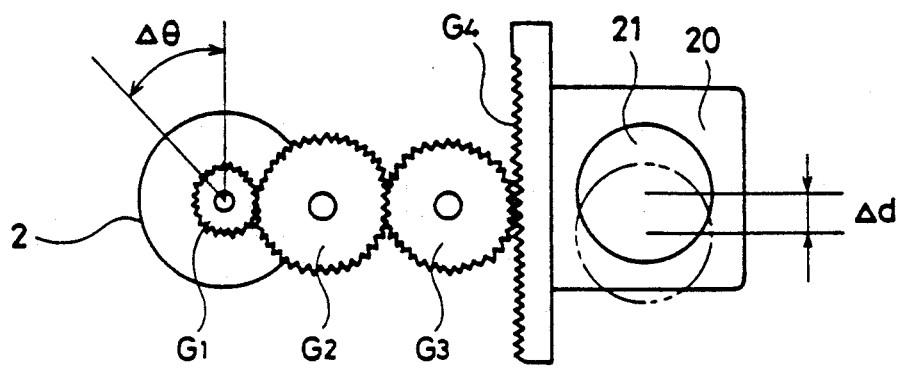
FIGS. 8A and 8B are front view of a driving system of an image blur correcting lens used in the present invention and a schematic diagram of a photographing optical system including the image blur correcting lens.

FIG. 8A shows a driving system of the image blur correcting lens used in the present embodiment. A gear G1 is attached to a rotation axis of the stepping motor 2. The power of rotation of the gear $G_1$ is transmitted to a rack $G_4$ through gears $G_2$ and $G_3$, to be converted into linear driving power. The image blur correcting lens 21 is held in a lens holding frame 20. The lens holding frame 20 is linearly driven by the rack $G_4$. Accordingly, if the axis of rotation of the stepping motor 2 is rotated by $\Delta\theta$, the optical axis of the image blur correcting lens 21 is shifted by $\Delta d$.

Figure 8B:
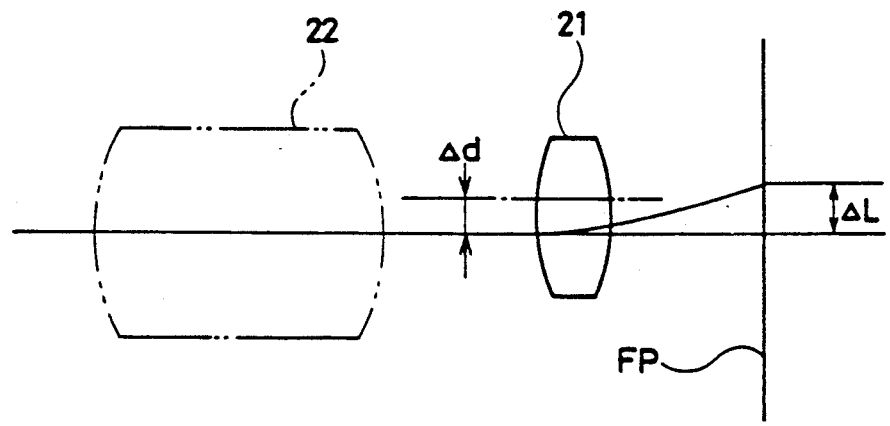

FIG. 8B shows a schematic structure of a photographing optical system including the image blur correcting lens employed in the present embodiment. Main lens group 22 of the photographing lens constitute the taking lens together with the image blur correcting lens 21. The reference character FP denotes a focal plane, and the light from the object is focused on the focal plane FP through the taking lens. When the amount of displacement of an image point on the focal plane FP is represented by $\Delta L$ when the image blur correcting lens 21 is displaced by $\Delta d$ in parallel to the optical axis, sensitivity of correction $L_H$ can be defined as $$L_H = \Delta d/\Delta L$$

At this time, the rotation angle of the rotary axis of the stepping motor 2 is represented as $\Delta\theta$ (degree), and transmission coefficient $K_{BM}$ is defined as $$K_{BM} = \Delta\theta/(360 \cdot \Delta d) \text{ [rotation/mm]}$$

An image conversion coefficient $K_B$ is defined by the following equation.

$$\begin{aligned} K_B &= \Delta\theta/(360 \cdot \Delta L) \\ &= \{\Delta\theta/(360 \cdot \Delta d)\} \times (\Delta d/\Delta L) \\ &= K_{BM} \cdot L_H \text{ [rotation/mm]} \end{aligned}$$

When the displacement caused by the image blur is provided as a function $f_F(t)$, the angle of rotation of the stepping motor 2 should be controlled such that the image is moved by $-f_F(t)$ to offset the image blur by means of the image blur correcting lens. When the angle of rotation of the stepping motor is represented as $\theta(t)$ $$\theta(t) = -K_B \cdot f_F(t) \text{ [rotation]}$$

By differentiating both sides of the equation, $$\theta'(t) = -K_B \cdot f_F'(t) \text{ [rotation/sec]}$$

when the angle rotated by the input of 1 pulse, that is, a step angle of the stepping motor 2 is represented as $\theta_s$ (degree), the pulse speed $f_P$ applied to the stepping motor can be calculated as $$f_p = 360 \cdot \theta'(t)/\theta s$$
$$= -360 \cdot K_B \cdot f_F'(t)/\theta s \quad [PPS]$$

The above described generating circuit 31 calculates and outputs the pulse speed $f_P$ based on the preset value $\theta s$, the value $K_B$ inputted from the ROM 6 contained in the exchange lens 5, and on the angular velocity information $fF'(t)$ inputted from the sensor 1. The start point of operation of the pulse generating circuit 31 is a certain time before the opening of the shutter, for example, it is the on time of the release switch or the mirror up start point of a reflex camera.

A specific example of a relation between the displacement of the image and the time when the present invention is applied will be described in the following.

Figure 9:
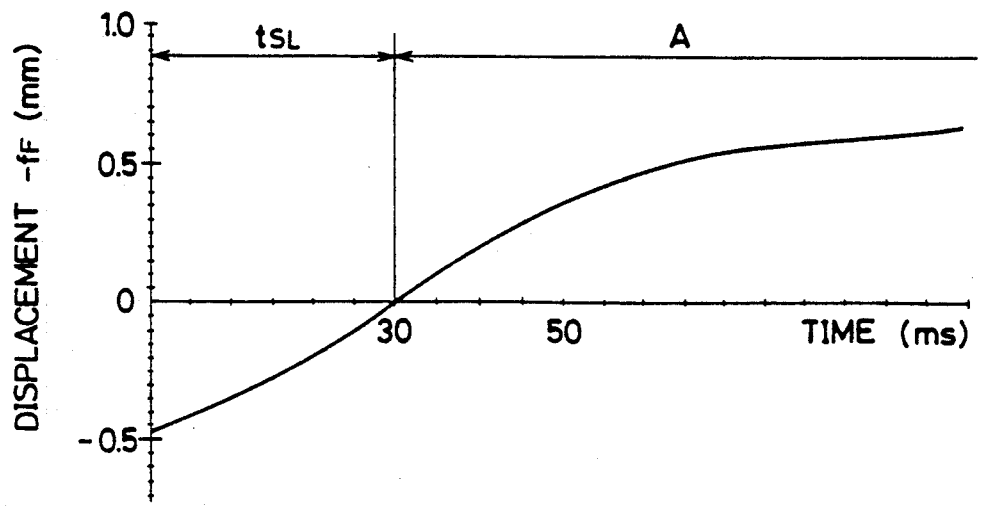
FIGS. 9 and 10 show operations when following control is carried out.
Figure 10:
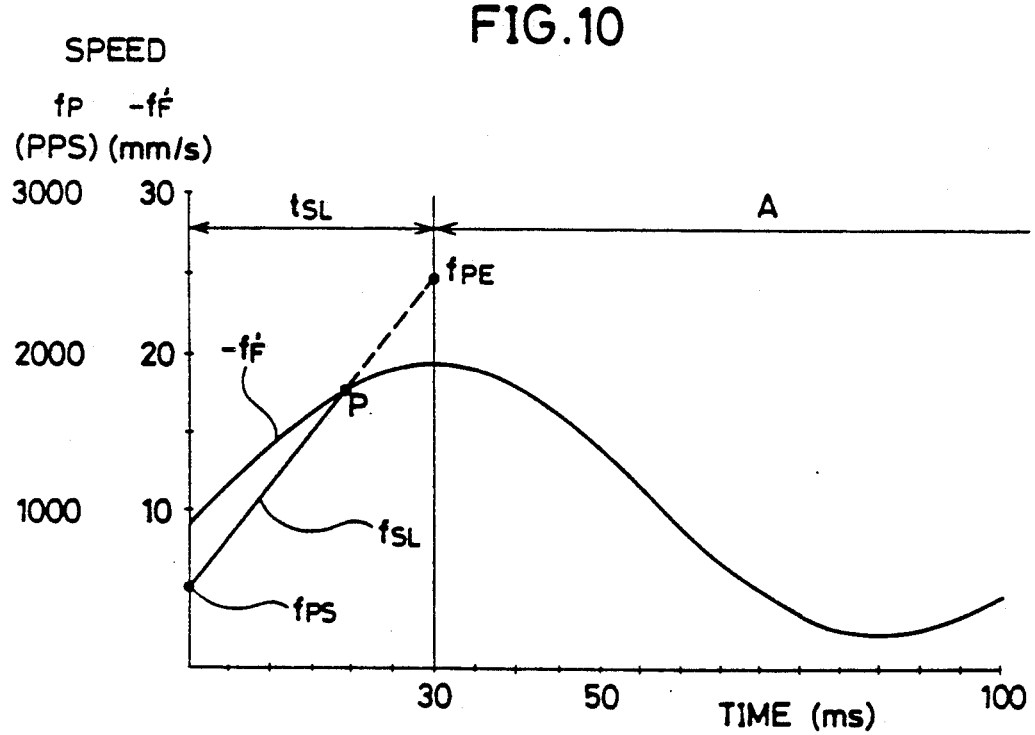

An output from the sensor 1 detecting a camera shake is inputted to a control circuit 3 a certain time before the opening of the shutter. When the pulse speed $f_P$ of the image blur correcting pulse is in the through region, a follow time $t_{SL}$ is provided before the exposure period A as shown in FIGS. 9 and 10. More specifically, at the start of the stepping motor, the pulse speed $f_{PS}$ in the self-starting region is provided, then the pulse speed $f_{SL}$ of the following pulse is linearly increased so that it attains to the pulse speed $f_{PE}$ in the through region after the lapse of the follow time $t_{SL}$. When it reaches the pulse speed $(-f_F')$ of the image blur correcting pulse at the point P, the above described follow control is stopped, and pulse speed corresponding to the pulse speed $(-f_F')$ of the image blur correcting pulse is applied to the stepping motor. In this manner, following operation to the pulse speed of the image blur correcting pulse is carried out in the follow time $t_{SL}$, whereby correction of image blur can be carried out from the time of shutter opening.

Figure 11:
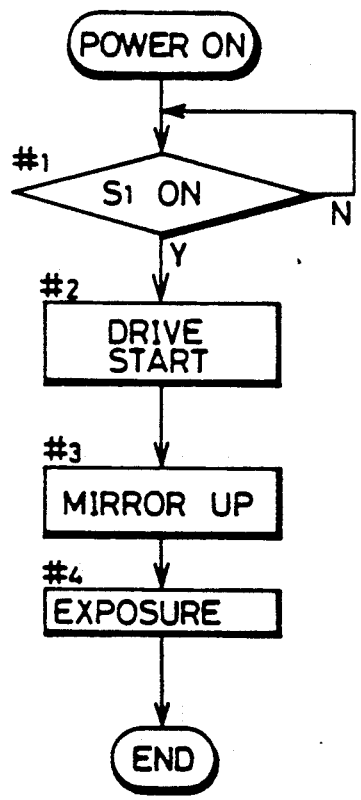
FIGS. 11 and 12 are flow charts showing the following operation in accordance with the present invention.
Figure 12:
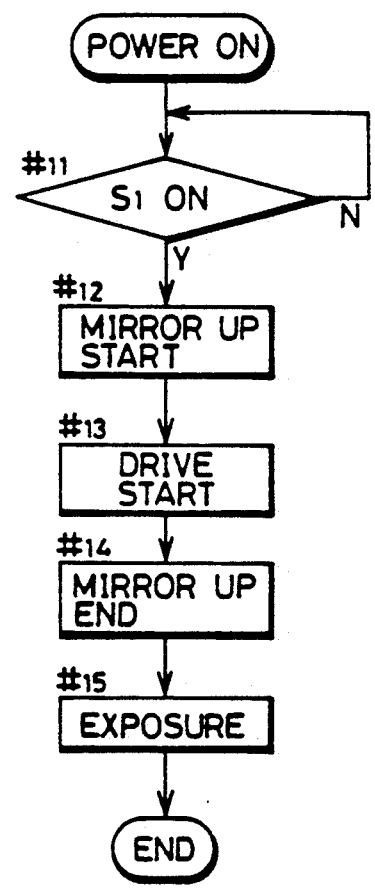

The flow of control in this case will be described with reference to FIGS. 11 and 12. FIG. 11 is a flow chart in which the following operation is started as soon as the release switch S1 is turned on. FIG. 12 is a flow chart in which the following operation is started simultaneously with the start of mirror up operation.

Referring to FIG. 11, when the release switch S1 is turned on, the pulse motor 2 is driven based on the image correcting pulses or the following pulses, mirror is elevated, and exposure is carried out (steps #1 to #4). A prescribed time is necessary for the mirror up operation (#3), and the following operation is carried out in this period.

Similarly, in the flow of FIG. 12, following operation is carried out from the start of the mirror up operation to the end the mirror up operation (steps #12 to #14).

(2) Second Embodiment

A second embodiment of the present invention will be described in the following. In the second embodiment also, structure around the control circuits of the image blur correcting apparatus and the structure of the correcting lens are the same as those in the first embodiment, so that the description thereof is not repeated, and only the differences over the first embodiment will be described.

The background and principal of the second embodiment will be described.

In a common image blur correcting apparatus, the device of the first embodiment in the method shown in FIG. 10 are satisfactory. However, at the point P of FIG. 10, when the pulse speed $f_{SL}$ of the following pulse which is linearly increasing is changed to the pulse speed $-f_F'$ of the image blur correcting pulse, there is a great change in acceleration, which may cause malfunction of the stepping motor.

In view of the foregoing, in the second embodiment, the pulse speed $f_{SL}$ of the following pulse is adapted to be moderately changed in a curve, so that it is changed to the pulse speed $f_F'$ of the image blur correcting pulse smooth. How to provide a plurality of interoperating points for smooth combination of $f_{SL}$ and $f_F'$ will be described in FIG. 13. Referring to the figure, the pulse speeds of the image blur correcting pulse at the time $t_s$ and $t_{n+1}$ are represented as $fF(t_n)$ and $fF(t_{n+1})$, respectively, the exposure start time is represented as $t_{ST}$, a point at the time $t_{ST}$ on a line extending from the point $(t_n, f_F(t_n))$ to the point $(t_{n+1}, f_F(t_{n+1}))$ is represented as Q, and the speed at this point is represented as $f_Q$. $f_P(t_n)$ corresponds to $f_{PS}$ of FIG. 10. A point at the time $t_{ST}$ on a line extending from the point $(t_{n+1}, f_F(t_{n+1}))$ in parallel to the time axis is represented as R, and the speed at this time is represented as $f_R$. A point dividing the line RQ into M:N is represented as U, and the speed at this point is represented as $f_U$. The pulse speed $f_P(t_{n+1})$ to be calculated is the speed at the time $t_{n+1}$ on the line connecting the point U with the point $(t_n, f_F(t_{n+1}))$ Relations between the respective speeds at respective points are as follows.

$$a_F(t_{n+1}) = \{f_F(t_{n+1}) - f_F(t_n)\}/(t_{n+1} - t_n)$$

$$f_Q = a_F(t_{n+1}) \times (t_{ST} - t_{n+1}) + f_F(t_{n+1})$$

$$f_R = f_F(t_{n+1})$$

$$f_U = (Mf_Q + Nf_R)/(M + N)$$

$$f_P(t_{n+1}) = \frac{f_U - f_P(t_n)}{t_{ST} - t_n}(t_{n+1} - t_n) + f_P(t_n)$$

Figure 14A:
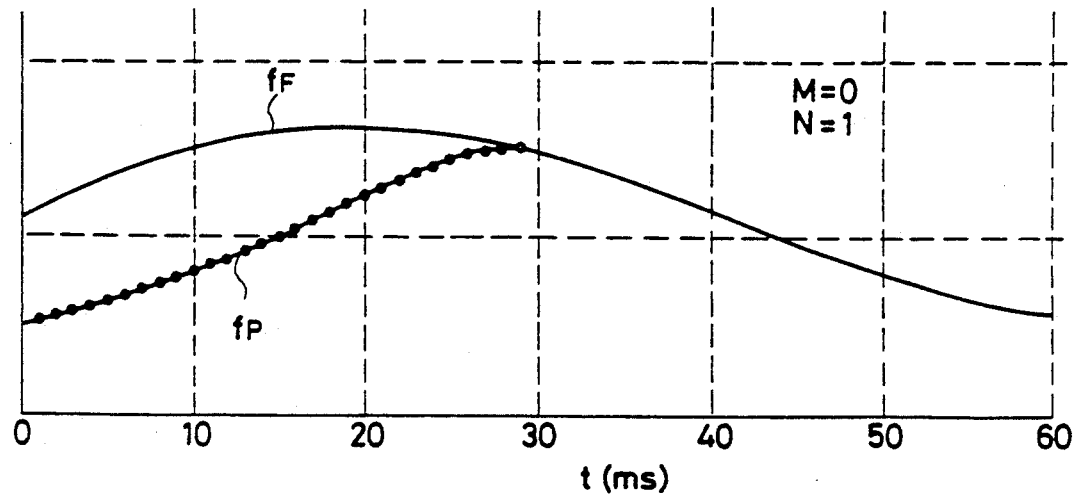
FIGS. 14(a), 14(b), 14(c), 15(a), 15(b), and 15(c) show examples of calculation of pulse speed in accordance with the second embodiment of the present invention.
Figure 14B:
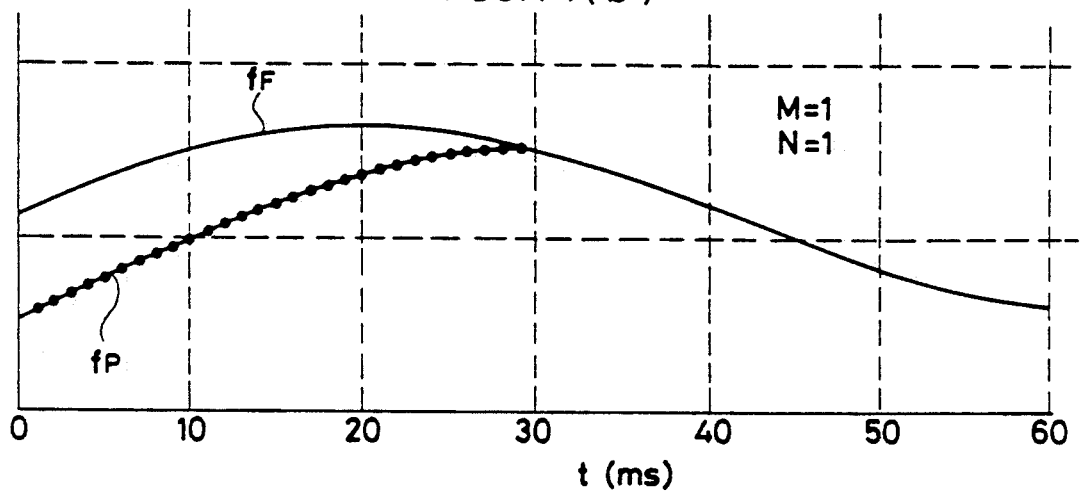
Figure 14C:
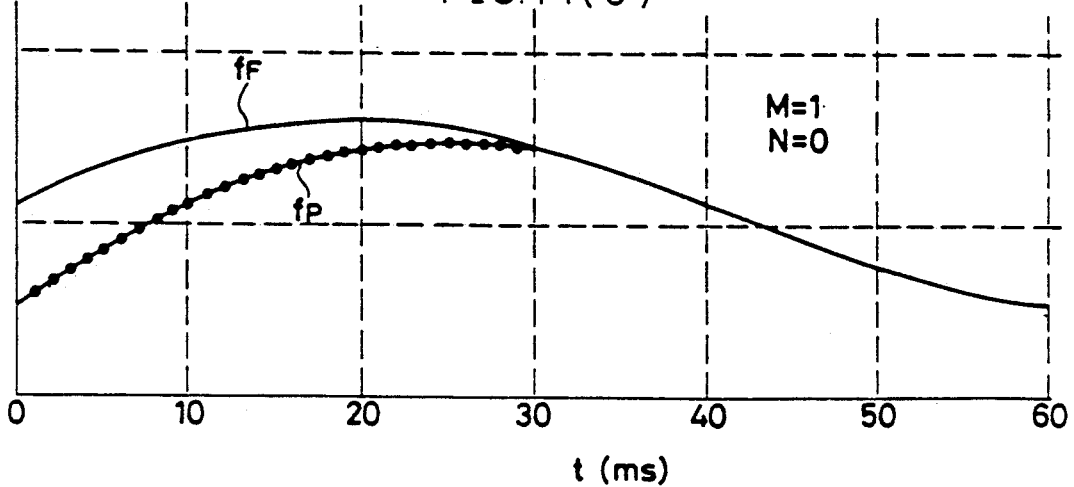
Figure 15A:
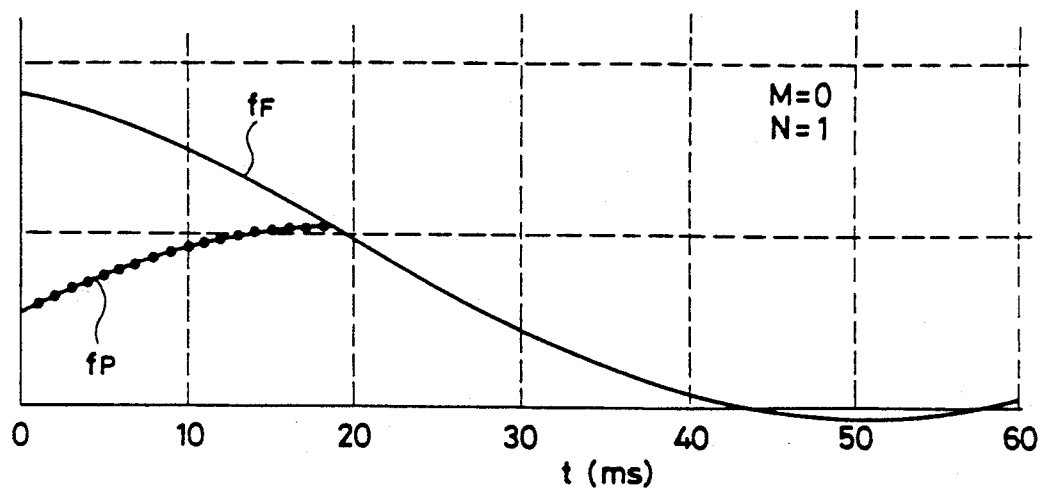

Actually, it takes some time to read the pulse speed $f_F(t_{n+1})$ of the image blur correcting pulse at the time $t_{n+1}$, to execute the above calculation and to calculate the pulse speed $f_P(t_{n+1})$ of the following pulses, and therefore the delay time should preferably be corrected. The combination of the coefficients M and N for finding the interior division point U is arbitrary. However, to facilitate calculation, 2's power such as 0, 1, 2, 4, ... may be employed as the coefficients. FIG. 14 (a), (b), (c) and FIG. 15 (a), (b), (c) show examples of calculation of the pulse speed $f_P$ of the following pulses corresponding to two different pulse speeds $f_F$ of the image blur correcting pulses with the coefficients (M, N) being (0, 1), (1, 1), and (1, 0). In these figures, circled pulse speeds $f_P$ are the results of calculation at $t_n, t_{n+1}, \ldots$, respectively.

By the above described method, the pulse speed $f_P$ of the following pulses can reach the pulse speed $f_F$ of the image blur correcting pulses smooth at the time $t_{ST}$, the follow control is stopped at this point, and the stepping motor is controlled by the pulse speed $f_F$ of the image blur correcting pulse. In this manner, correction of image blur can be done from the start of shutter opening.

The follower circuit 33 in the second embodiment will be described in the following. In the follower circuit 3, when it is determined by the determination circuit 32 that the pulse speed $f_F$ of the image blur correcting pulse is in the through region, the pulse speed $f_P$ of the following pulses is calculated and outputted. The pulse speed $f_F(t)$ of the image blur correcting pulse at a time t is represented as $f_F(t)$, the acceleration is $\alpha_F(t)$, and pulse speed of the following pulses is represented as $f_P(t)$, the pulse speed of the following pulse $f_P(t+\Delta t)$ at the time $(t+\Delta t)$ after the lapse of a short time $\Delta t$, is provided by the following equation.

$$f_P(t + \Delta t) = f_P(t) + (\Delta t/t_s) \times \{W_1 f_F(t + \Delta t) + W_2 \alpha_F(t + \Delta t) \times t_s\}$$

In the above equation, $t_S$ represents the remaining time of following until the pulse speed $f_P$ of the image blur correcting pulse and the pulse speed $f_{SL}$ of the following pulse coincide with each other, and $W_1$ and $W_2$ are weight coefficients. The weight coefficients $W_1$ and $W_2$ are set such that the pulse $f_P$ of the following pulses reach smooth the pulse speed $f_F$ of the image blur correcting pulse based on the principle described with reference to FIGS. 13 to 15.

Figure 15B:
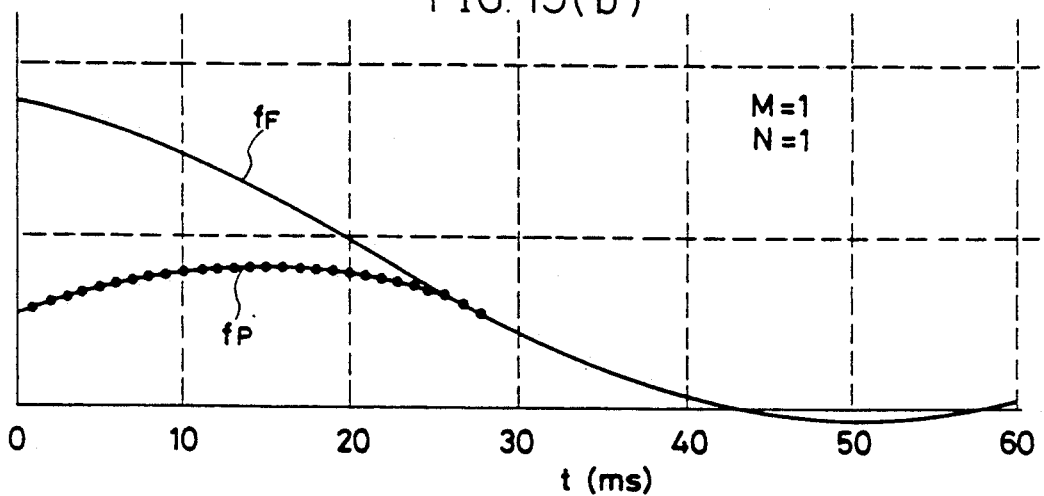
Figure 15C:
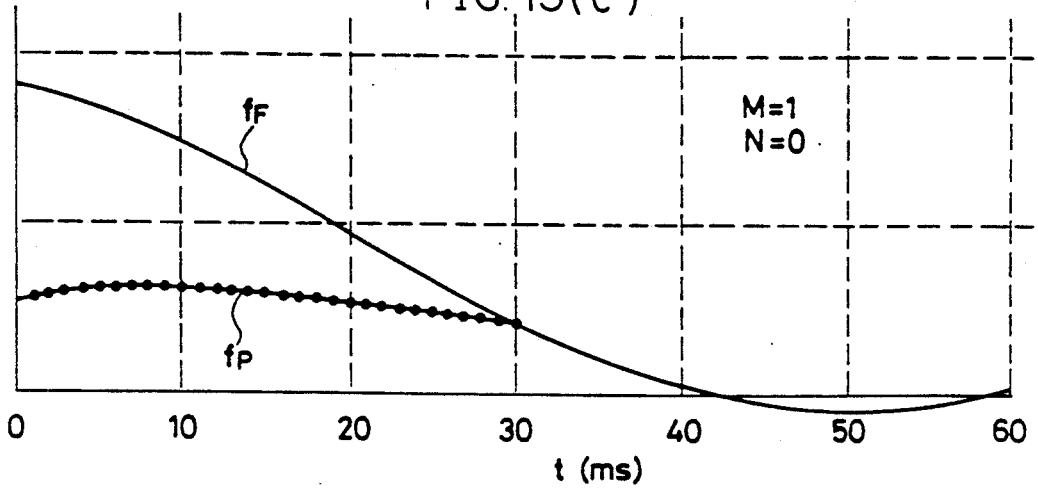

The following operation mentioned here means that the pulse speed is made to reach the correcting pulse speed smoothly after the pulse speed becomes near to that of a desired pulse speed of the image blur by a prescribed speed. Therefore, the following operation is applicable to the cases where the pulse speed continues to increase as time passes as shown in FIG. 14(b) and where the pulse speed increases once and then decreases gradually as shown in FIG. 15(b).

Figure 16:
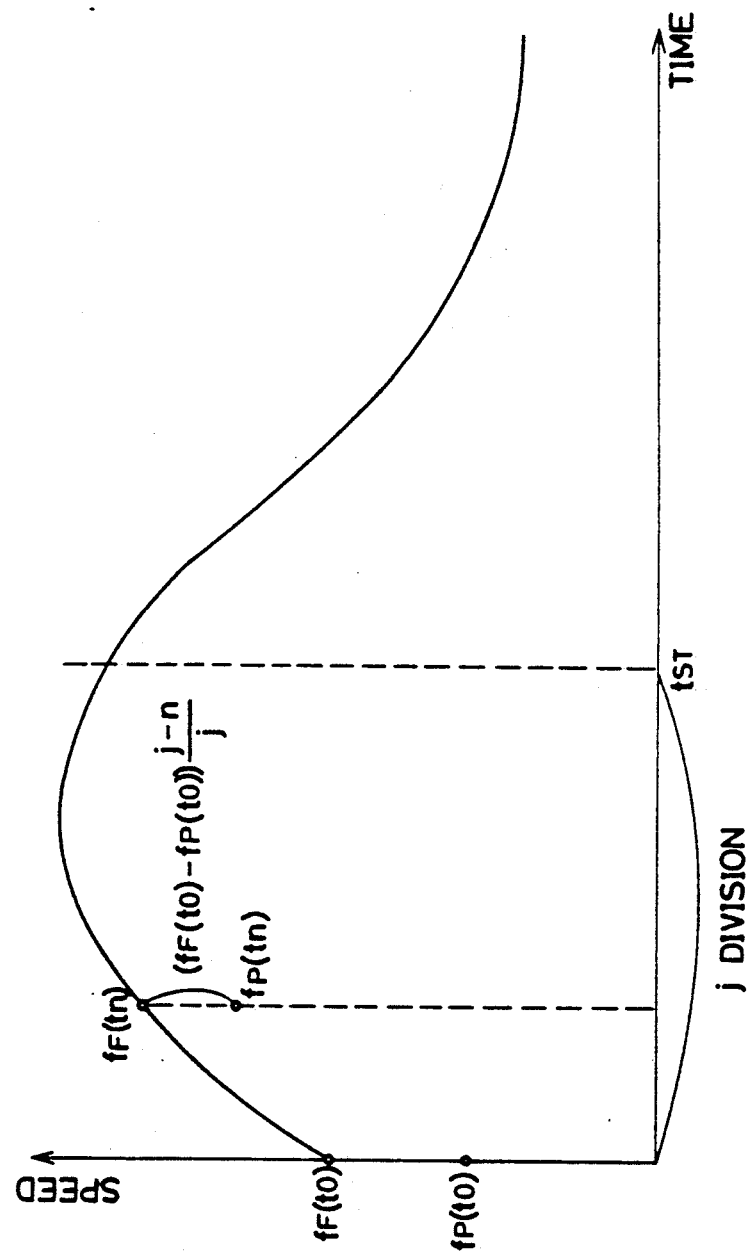
FIG. 16 shows a modification of the second embodiment of the present invention.

As another embodiment, the following pulses may be outputted such that the difference between the pulse speed $f_F$ of the image blur following pulse and the pulse speed $f_B$ of the following pulse is linearly decreased to zero as a lapse of a prescribed time before the opening of the shutter. This embodiment will be described with reference to FIG. 16. The pulse speed of the image blur correcting pulse at the start of following control is represented as $f_F(t_p)$, and the pulse speed of the following pulse is represented as $f_P(t_0)$. In the following time $t_{ST}$, calculation of the pulse speed $f_P(t_n)$ can be carried out for j times. In this case, the difference between the pulse speed of the image blur correcting pulse and the pulse speed of the following pulse is $\{f_F(t_0) - f_P(t_0)\}$ at first. If the difference in speed is decreased by $\{f_F(t_0) - f_P(t_0)\}/j$ in every calculation, the difference in speed becomes zero through j times of operations. Based on this idea, the pulse speed $f_P(t_n)$ of the following pulse at nth calculation is determined by the following equation.

$$f_P(t_n) = f_F(t_n) - (j-n) \times \{f_F(t_0) - f_P(t_0)\}/j$$

By the above described method, the pulse speed $f_P$ of the following pulse can reach smooth the pulse speed of the image blur correcting pulse at the end of follow control.

Since the switching from the following operation before the opening of the shutter to the image blur correcting operation after the opening of the shutter can be made smooth as the pulse speed of the following pulse can be determined in the above described manner, malfunction of the stepping motor can be prevented.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image blur correcting apparatus of a camera, comprising:
   a photographing optical system;
   a sensor for detecting camera shake;
   a correcting lens provided in said photographing optical system for correcting image blur;
   a stepping motor for driving said correcting lens; and
   control means for generating correcting pulses for correcting the blur of the object image based on an output from said sensor, and for driving said stepping motor based on the pulses, wherein
   said control means comprises pulse outputting means for outputting following pulses whose speed increases as time passes, and
   said control means starts driving of the stepping motor based on said following pulses at a prescribed time before the start of exposure.

2. An image blur correcting apparatus of a camera according to claim 1, wherein
   said control means further comprises
   determining means for determining whether driving at the start is to be based on said following pulses or on the correcting pulses.

3. An image blur correcting apparatus of a camera according to claim 1, wherein
   said control means further comprises
   comparing means for comparing the pulse speed of said following pulses and the pulse speed of the correcting pulses,
   said stepping motor being driven based on said correcting pulses after the pulse speed of said following pulses reaches the pulse speed of said correcting pulses.

4. An image blur correcting apparatus of a camera, comprising:
   (a) a photographing optical system;
   (b) a sensor for detecting the camera shake;
   (c) a correcting lens provided in said photographing optical system for correcting said image blur;
   (d) a stepping motor for driving said correcting lens; and
   (e) control means for generating correcting pulses for correcting the blur of the object image based on an output from said sensor, and for driving the stepping motor based on the pulses, said control means including pulse output means for outputting following pulses whose speed increases as time passes,
   said stepping motor being driven based on said following pulses at the start of driving.

5. An image blur correcting apparatus of a camera according to claim 4, wherein
   said control means further comprises
   comparing means for comparing the pulse speed of said following pulses with the pulse speed of said correcting pulses,
   said stepping motor being driven based on said correcting pulses after the pulse speed of said following pulses reaches the pulse speed of said correcting pulses.

6. An image blur correcting apparatus of a camera according to claim 5, wherein
   said pulse output means controls the pulse speed of said following pulses to minimize difference between amount of change of the pulse speed of following pulses and the amount of change of the pulse speed of said correcting pulses when the pulse speed of said following pulses reaches the pulse speed of said correcting pulses, based on the output from said sensor.

7. An image blur correcting apparatus of a camera according to claim 6, wherein
said pulse output means controls the pulse speed of said following pulses to reach the pulse speed of the correcting pulses in a prescribed time period.

8. An image blur correcting apparatus of a camera according to claim 7, wherein
when the pulse speed of the image blur correcting pulses at a time t is represented as $V_F(t)$, acceleration is represented as $\alpha_F(t)$, remaining time of slow up operation at the prescribed time is represented as $t_s$, wait coefficient are represented as $W_1$ and $W_2$, and the pulse speed of the following pulses is represented as $V_P(t)$, the pulse speed $V_P(t+\Delta t)$ at a time $(t+\Delta t)$ after a lapse of a short period of time $\Delta t$ is represented as $$V_P(t+t\Delta) = V_P(t) + (\Delta t/t_s) \times \{W_1 \cdot V_F(t+\Delta t) + W_2 \cdot \alpha_F(t+\Delta t) \times t_s\}.$$

9. An image blur correcting apparatus according to claim 4, wherein
said control means drives said stepping motor based on the following pulses only before the start of exposure.

10. An image blur correcting apparatus of a camera, comprising:
a sensor for detecting a shake of a camera;
a stepping motor for driving an image blur correcting lens included in a photographing optical system of the camera; and
control circuit receiving a sensor output a prescribed time before opening of a shutter for outputting an control pulse to the stepping motor so as to correct image blur of the camera; wherein
said control circuit including
a pulse generating circuit for generating image blur correcting pulses based on the sensor output,
a determining circuit for determining whether pulse speed of the image blur correcting pulse is in a controllable automatic start region or in an uncontrollable through region, at a time of start the stepping motor,
a slow up circuit for outputting following pulses whose pulse speed is increased as time passes to move from the automatic start region to the through region, when it is determined by the determining circuit at the pulse speed of the image blur correcting pulses is in the through region, and
a comparing circuit for using following pulses outputted from the slow up circuit instead of the image blur correcting pulses outputted from the pulse generating circuit as output from the control circuit, until the pulse speed of the following pulses reach the pulse speed of the image blur correcting pulses when the slow up circuit is in operation.

11. An image blur correcting apparatus of a camera according to claim 10, wherein
said prescribed time is on time of a release switch.

12. An image blur correcting apparatus of a camera according to claim 10, wherein
said prescribed time is mirror up start time of a reflex camera.

13. An image blur correcting apparatus for a camera, comprising:
a photographing optical system;
a sensor for detecting camera shake;
a correcting lens provided in said photographing optical system for correcting image blur;
an actuator for driving said correcting lens; and
control means for generating correcting signals for correcting the blur of the object image based on an output from said sensor, and for driving the actuator based on the signals, said control means including signal output means for outputting following signals whose speed increases as time passes,
said actuator being driven based on said following signals at the start of driving.

14. An image blur correcting apparatus for a camera, comprising:
a photographing optical system;
a sensor for detecting camera shake;
a correcting lens provided in said photographing optical system for correcting image blur;
an actuator for driving said correcting lens; and
control means for generating correcting signals for correcting the blur of the object image based on an output from said sensor, and for driving the actuator based on the signals, wherein
said control means includes a signal outputting means for outputting following signals whose speed increases as time passes and reaches the signal speed of the correcting signals in a prescribed time period; and comparing means for comparing the signal speed of said following signals with the signal speed of said correcting signals,
said actuator being driven based on said following signals at the start of driving, and being driven based on said correcting signals after the signal speed of said following signals reaches the signal speed of said correcting signals, wherein
when the signal speed of the correcting signals at a time t is represented as $V_F(t)$, acceleration is represented as $\alpha_F(t)$, remaining time of slow up operation at the prescribed time is represented as $t_s$, weight coefficients are represented as $W_1$ and $W_2$, and the signal speed of the following signals is represented as $V_P(t)$, the signal speed $V_P(t+\Delta t)$ at a time $(t+\Delta t)$ after a lapse of a short period of time $\Delta t$ is represented as $$V_P(t+\Delta t) = V_P(t) + (\Delta t/t_s) \times \{W_1 V_F(t+\Delta t + W_2 \alpha_F(t+\Delta t) \times t_s\}.$$

15. An image blur correcting apparatus for a camera, comprising:
a sensor for detecting shake of a camera;
a stepping motor for driving an image blur correcting lens included in a photographing optical system of the camera; and
control circuit receiving a sensor output a prescribed time before opening of a shutter for outputting a control pulse to the stepping motor so as to correct image blur of the camera; wherein
said control circuit includes
a pulse generating circuit for generating image blur correcting pulses based on the sensor output,
a slow up circuit for outputting following pulses whose pulse speed increases as time passes, and a determining circuit for determining whether said control circuit outputs image blur correcting pulses or following pulses at the start of driving the stepping motor.

16. An image blur correcting apparatus for a camera, comprising:

a sensor for detecting shake of a camera;

an actuator for driving an image blur correcting lens included in a photographing optical system of the camera; and control circuit receiving a sensor output a prescribed time before opening of a shutter for outputting a control signal to the actuator so as to correct image blur of the camera; wherein said control circuit includes a signal generating circuit for generating image blur correcting signals based on the sensor output, a slow up circuit for outputting following signals whose signal speed increases as time passes, and a determining circuit for determining whether said control circuit outputs image blur correcting signals or following signals at the start of driving the actuator.

* * * * *